United States Patent
Schlitt

(10) Patent No.: US 10,212,920 B1
(45) Date of Patent: Feb. 26, 2019

(54) PET WASTE COLLECTOR AND DISPOSAL DEVICE

(71) Applicant: William Schlitt, Dade City, FL (US)

(72) Inventor: William Schlitt, Dade City, FL (US)

(*) Notice: Subject to any disclaimer, the term of this patent is extended or adjusted under 35 U.S.C. 154(b) by 0 days.

(21) Appl. No.: 15/647,842

(22) Filed: Jul. 12, 2017

Related U.S. Application Data

(60) Provisional application No. 62/433,929, filed on Dec. 14, 2016.

(51) Int. Cl.
*A01K 29/00* (2006.01)
*A01K 23/00* (2006.01)

(52) U.S. Cl.
CPC .................. *A01K 23/005* (2013.01)

(58) Field of Classification Search
CPC .................................... A01K 23/005
USPC ........ 294/1.3, 1.4, 1.5, 50, 51, 52, 176, 181; 15/257.1, 257.2, 257.4, 257.7, 257.8; D30/162
See application file for complete search history.

(56) References Cited

U.S. PATENT DOCUMENTS

| | | | | |
|---|---|---|---|---|
| 3,052,214 A * | 9/1962 | Johnson | ............... | A01K 23/005 15/257.6 |
| 3,910,619 A * | 10/1975 | Schmieler | ............. | E01H 1/1206 15/257.6 |
| 4,042,269 A * | 8/1977 | Skermetta | ............ | A01K 23/005 15/257.3 |
| 4,236,741 A * | 12/1980 | Emme | .................. | A01K 23/005 294/1.5 |
| 4,641,873 A * | 2/1987 | Nurnberger | .......... | E01H 1/1206 294/1.4 |
| 4,718,707 A * | 1/1988 | Greenhut | .............. | E01H 1/1206 294/1.4 |
| 4,852,924 A * | 8/1989 | Ines | ..................... | A01K 23/005 294/1.5 |
| 4,948,266 A * | 8/1990 | Bencic | .................. | A47L 9/1445 220/495.08 |
| 5,056,842 A * | 10/1991 | Lindenberg | .......... | E01H 1/1206 294/1.4 |
| 5,403,050 A * | 4/1995 | Searing | ................ | A01K 23/005 294/1.5 |
| 6,164,710 A * | 12/2000 | Shibuya | ............... | A01K 23/005 15/257.3 |
| 6,637,791 B1 * | 10/2003 | Steadman | ............. | E01H 1/1206 15/257.6 |
| 6,942,264 B1 * | 9/2005 | Mendez | ............... | A01K 23/005 294/1.5 |
| D662,268 S * | 6/2012 | Pearcey | ....................... | D30/162 |
| D796,126 S * | 8/2017 | Gonzalez | ..................... | D30/162 |
| 2004/0124646 A1 * | 7/2004 | Peko | .................... | A01K 23/005 294/1.4 |
| 2006/0001281 A1 * | 1/2006 | Hubert | ................. | A01K 23/005 294/1.5 |
| 2009/0045639 A1 * | 2/2009 | Shalhoub | ............. | A01K 23/005 294/1.5 |
| 2011/0289024 A1 * | 11/2011 | Chongtoua | .......... | A01K 1/0125 705/500 |

(Continued)

*Primary Examiner* — Paul T Chin
(74) *Attorney, Agent, or Firm* — Larry D. Johnson

(57) ABSTRACT

A pet waste collector and disposal device includes a pole connected to a container housing, supporting a disposable container that may be positioned beneath a dog to capture the waste in the container before the waste reaches the ground. The disposable container may then be closed and disposed of in the conventional manner.

3 Claims, 4 Drawing Sheets

(56) References Cited

U.S. PATENT DOCUMENTS

| | | | | |
|---|---|---|---|---|
| 2015/0233068 A1* | 8/2015 | Bevans | ................ | E01H 1/1206 294/1.4 |
| 2016/0050885 A1* | 2/2016 | Brasuel | ................ | A01K 23/005 294/1.5 |

* cited by examiner

PET WASTE COLLECTOR AND DISPOSAL DEVICE

CROSS REFERENCE TO RELATED APPLICATIONS

The present application claims the benefit of the filing date of U.S. Provisional Patent Application Ser. No. 62/433,929, filed Dec. 14, 2016. The foregoing application is incorporated by reference in its entirety as if fully set forth herein.

TECHNICAL FIELD

This written description relates generally to a pet cleaning device, and more particularly to a pet waste collector and disposal device.

BACKGROUND

There are many joys and benefits to dog ownership. Dogs can provide companionship and intimacy to everyday life for the pet owner. However, caring for a dog can become painstaking for the owner as they must clean up after their dog, especially when they are out walking or in any public place.

SUMMARY

Described below is a pet waste collector and disposal device, which facilitates cleaner, easier, and more efficient pet waste removal compared to conventional bag pickup and cleanup, and which does not leave any traces of the pet waste on concrete, blacktop, or grass surfaces.

Particular embodiments of the subject matter described in this specification can be implemented so as to realize one or more of the following advantages.

In some implementations, the device includes a pole connected to a container housing, supporting a disposable container that may be positioned beneath a dog to capture the waste in the container before the waste reaches the ground. The disposable container may then be closed and disposed of in the conventional manner.

In some implementations, the pole is adjustable in length to accommodate a dog owner's height, and the height of the dog.

In some implementations, the pole is connected to the container housing with a connector that enables angular adjustment, to facilitate proper angular positioning of the disposable container beneath the dog.

In some implementations, the disposable container is a clamshell with a lid that can be closed and sealed air tight to prevent waste odors from escaping prior to disposal of the container.

In some implementations, the disposable container is rigid or semi-rigid so as not to deform or collapse on any waste carried within, facilitating sanitary and discreet disposal of the container.

The details of one or more embodiments of the subject matter described in this specification are set forth in the accompanying drawings and the description below. Other features, aspects, and advantages of the subject matter will become apparent from the description, the drawings, and the claims.

Those skilled in the art will appreciate that the conception upon which this disclosure is based readily may be utilized as a basis for the designing of other structures, methods and systems that include one or more of the various features described below.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

DETAILED DESCRIPTION

Figure 1:
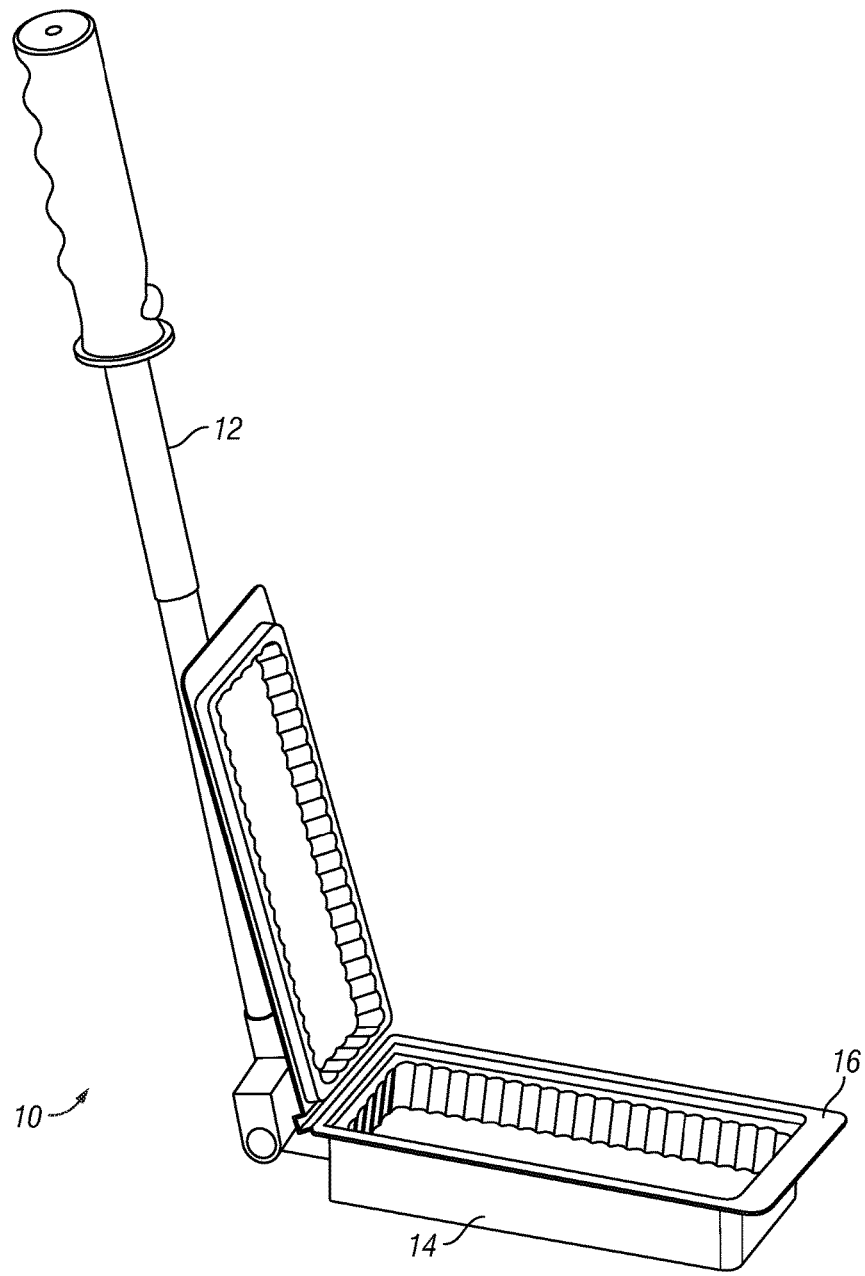
FIG. 1 is a perspective view of one implementation of a pet waste collector and disposal device.

Referring to FIGS. 1 through 4, wherein like reference numerals refer to like components in the various views, there is illustrated therein a pet waste collector and disposal device, generally denominated 10 herein.

FIG. 1 is a perspective view of one implementation of a pet waste collector and disposal device 10, including a pole 12 connected to a container housing 14, and supporting a disposable container 16. In some implementations, pole 12 includes two or more telescoping sections to accommodate a dog owner's height, and the height of the dog. In some implementations, the telescoping sections do not rotate relative to each other when extended, preventing potential spillage of waste. In some implementations, the pole is approximately 19 inches in length when retracted, enabling easy and discreet carrying by the dog owner.

Figure 2:
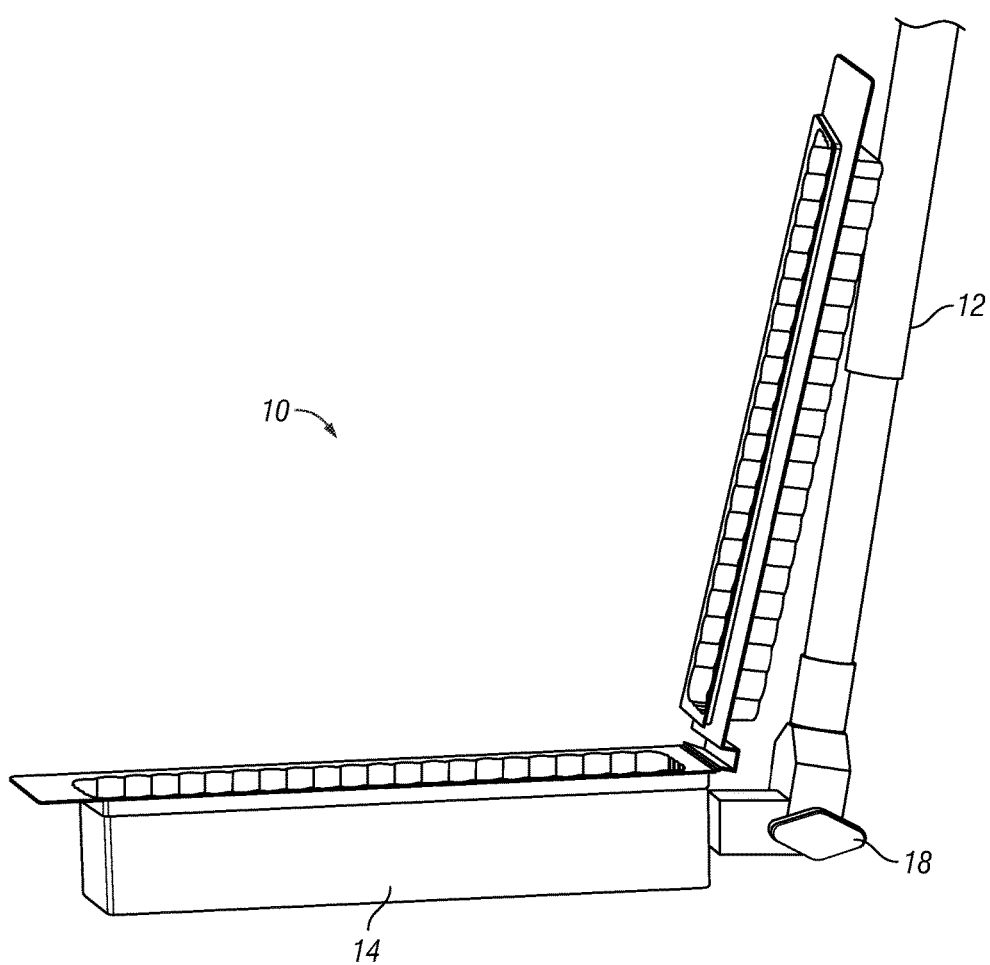
FIG. 2 is a side view thereof.

FIG. 2 is a side view of a device 10. In some implementations, pole 12 is connected to housing 14 with a lockable hinged bracket 18, to facilitate proper angular positioning of the disposable container beneath the dog. In some implementations, housing 14 comprises a rectangular frame, approximately 7 inches long, 3 inches wide (allowing access between the legs of even small dogs), and 2 inches deep. In some implementations, housing 14 is made of plastic, and may be colored green (to simulate grass), black (to simulate blacktop), or gray (to simulate concrete).

Figure 3:
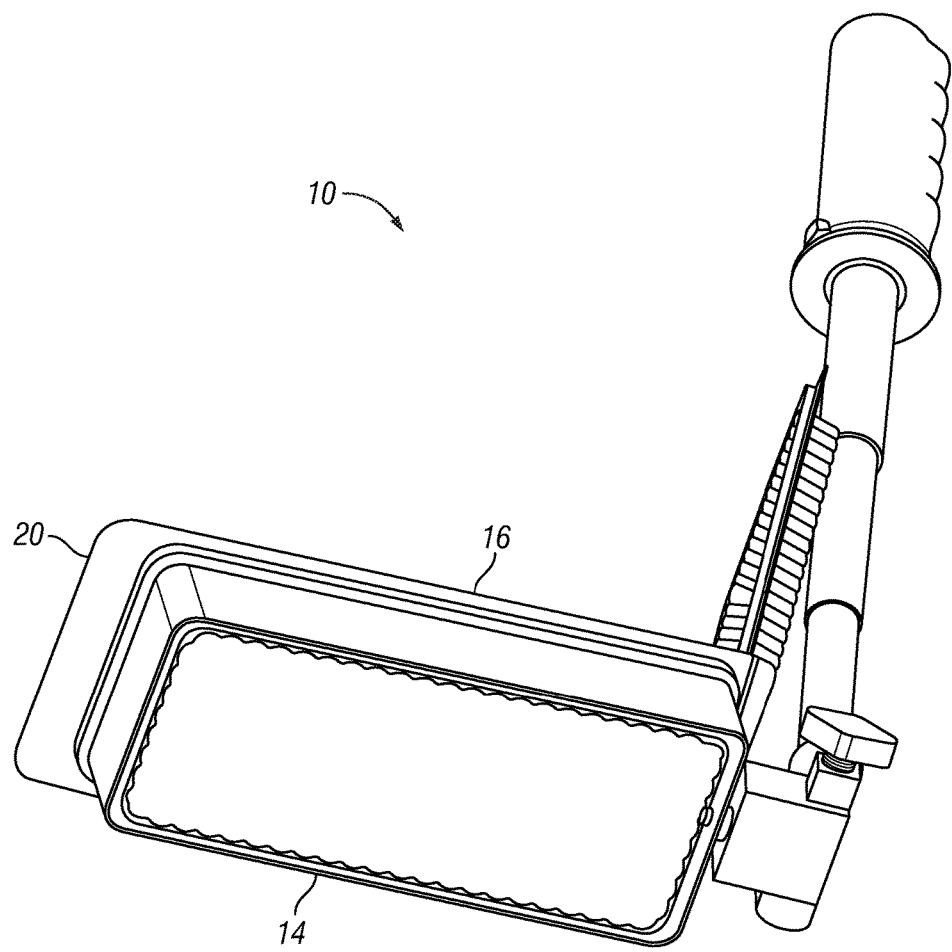
FIG. 3 is a bottom view thereof.

FIG. 3 is a bottom view of a device 10. In some implementations, disposable container 16 includes a lip 20 that rests on the periphery of housing 14.

Figure 4:
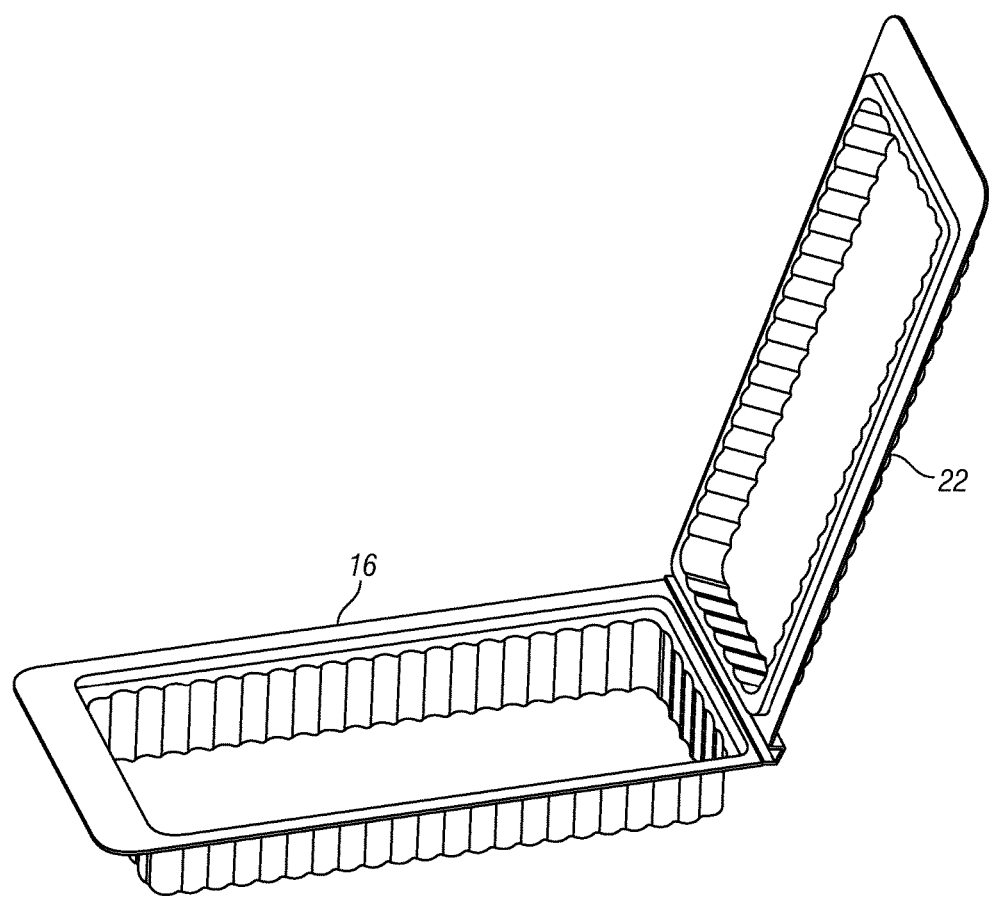
FIG. 4 is a perspective view of one implementation of a disposable container.

FIG. 4 is a perspective view of one implementation of a disposable container 16. In some implementations, the disposable container is a clamshell with a lid 22 that can be closed and sealed air tight to prevent waste odors from escaping prior to disposal of the container. In some implementations, disposable container 16 is made of plastic. In another implementation, disposable container 16 is made of a biodegradable material such as sugar cane. In still another implementation, disposable container 16 is approximately 7¼ inches long, 2¾ inches wide, and 2 inches deep. In some implementations, disposable container 16 is rigid or semi-rigid so as not to deform or collapse on any waste carried within, facilitating sanitary and discreet disposal of the container.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A pet waste collector and disposal device comprising:
   a pole comprising telescoping sections that do not rotate relative to each other when extended, wherein the pole is adjustable in length to accommodate a dog owner's height, and the height of the dog;
   a container housing connected to the pole with a connector comprising a lockable hinged bracket that enables angular adjustment of the container housing relative to the pole to facilitate proper angular positioning beneath the dog; and
   a disposable container carried in the container housing, the disposable container having a lip that rests on a periphery of the container housing, wherein the disposable container may be positioned beneath a dog to capture waste in the disposable container before the waste reaches the ground, and the disposable container may then be closed and disposed of, wherein the disposable container is a clamshell with a lid that can be closed and sealed air tight to prevent waste odors from escaping prior to disposal of the container, and wherein the disposable container is rigid or semi-rigid so as not to deform or collapse on any waste carried within.

2. The device of claim 1 wherein the disposable container is made of plastic.

3. The device of claim 1 wherein the disposable container is made of a biodegradable material.

* * * * *